United States Patent [19]

Quiénot

[11] 4,124,405

[45] Nov. 7, 1978

[54] PROCESS FOR SOLIDIFYING AQUEOUS WASTES AND PRODUCTS THEREOF

[75] Inventor: Jean Quiénot, Palaiseau, France

[73] Assignee: PEC-Engineering Societe Anonyme, Paris, France

[21] Appl. No.: 710,666

[22] Filed: Aug. 2, 1976

[30] Foreign Application Priority Data

Aug. 6, 1975 [FR] France .................................. 75 24469

[51] Int. Cl.$^2$ ............................................. C04B 11/14
[52] U.S. Cl. ..................................... 106/111; 106/85; 106/89; 106/90; 106/109
[58] Field of Search ..................... 106/117, 85, 89, 90, 106/109, 110, 111

[56] References Cited

U.S. PATENT DOCUMENTS

| 1,033,984 | 7/1912 | Brown ................................. 106/117 |
| 1,635,212 | 7/1927 | Herrly ................................ 106/117 |
| 2,070,036 | 2/1937 | Witty .................................. 106/117 |
| 2,302,988 | 11/1942 | Witty .................................. 106/117 |
| 2,362,060 | 11/1944 | Etridge et al. ..................... 106/117 |
| 3,920,795 | 11/1975 | Selmeczi et al. ................... 106/117 |

*Primary Examiner*—L. Dewayne Rutledge
*Assistant Examiner*—John P. Sheehan
*Attorney, Agent, or Firm*—Millen & White

[57] ABSTRACT

The water-soluble pollutants contained in aqueous industrial, agricultural and domestic waste materials are converted into a water-insoluble solid mass with improved resistance to leaching of the pollutants therefrom by treatment with a particulate metallurgical slag under alkaline conditions, in the presence of a hydration-promoting agent for the slag, e.g., gypsum.

13 Claims, No Drawings

4,124,405

PROCESS FOR SOLIDIFYING AQUEOUS WASTES AND PRODUCTS THEREOF

BACKGROUND OF THE INVENTION

This invention relates to a process for the treatment of wastes in the form of liquids or aqueous sludges, e.g., industrial, agricultural and domestic wastes. More particularly, this invention relates to a process for the solidification of wastes to convert the latter into solid materials having great stability with respect to external agents, such as water, and a high retention power for the pollutant materials contained in these wastes. In another aspect, this invention relates to the use for various purposes of the thus-treated waste material.

The growing volume of wastes and residues of all types, in the form of liquids, sludges and slurries, presents greater and greater problems for manufacturers and municipalities, particularly due to the fact that the waste materials present serious hazards to the environment and living beings. In some cases, it is possible to incinerate the sludges if they have sufficiently high fuel content. In other cases, they can be spread on agricultural or wooded lands. However, very often the only solution acceptable from an economic and ecological point of view is to treat the sludges in order to achieve fixation of the pollutants therein by physico-chemical solidification.

For this purpose, methods have been proposed which consist of mixing the sludges to be treated with appropriate proportions of various products such as, for example, Portland cement alone or together with pozzolana (finely divided siliceous, or siliceous and aluminous material which reacts chemically with slaked lime at ordinary temperatures in the presence of moisture to form a strong, slow-hardening cement), sodium silicate together with a setting agent, such as lime, calcium chloride, Portland cement, calcium carbonate, mixtures of lime and pozzolana, gypsum or plaster of Paris, optionally together with organic resins, bitumens, calcium sulfate and sulfite mixed with lime and/or possolana.

These various methods provide solutions in a few special cases but they have serious drawbacks which prevent their general use. Moreover, the treated sludges sometimes have a very basic pH which can be higher than 10 and comprise a relatively high content of leachable ions and molecules noxious to the environment, for example, $Na^+$, $Cu^{2+}$, $Zn^{2+}$, $Ca^{2+}$, $Cr^{2+}$, $SO_4^{2-}$, $F^-$, $PO_4^{3-}$, and hydrocarbons.

The pollutant components of the thus-treated waste, theoretically fixed in the solid mass produced by such a treatment, actually are partially removable therefrom, e.g., by water lixiviation (leaching), by the action of atmospheric agents, e.g., hot air, or as the result of cyclical freezing and thawing. It appears that the abnormally high content of some non-fixed ions comes from one or several of the reactants used in some of these methods. For example, non-fixed sodium contents higher than attributable to the lixiviation of the raw waste material, all the other conditions being the same, can be explained by the use of sodium silicate as the main reactant. These known methods also are costly because the quantitites of reactants used are high and the reactants generally employed, e.g., Portland cement, sodium silicate, etc., are expensive. Most of the known methods are selective for a given type of sludge and, in some cases, they give rise to the formation of water-soluble free lime which plays a significant role in the phenomenon which renders the structure of thus-produced metal silicate fragile.

It is an object of this invention to obviate these drawbacks of the prior art processes by providing a process useful for the treatment of a wide variety of sludges and aqueous wastes to produce solidified and hardened composite materials having high inertness and stability under usual ecological conditions. In particular, this invention converts the pollutants in wastes into solid products which, when contacted with water, for example, do not liberate a large part of the pollutant compounds fixed therein.

SUMMARY OF THE INVENTION

In one process aspect, this invention relates to an improved process for the treatment of aqueous wastes containing water-soluble environmental pollutants with a setting agent under alkaline conditions which converts the pollutants into a water insoluble mass, which comprises employing as the setting agent a particulate metallurgical slag, in the presence of a hydration-promoting agent for the slag.

DETAILED DISCUSSION

Any aqueous waste solidifiable by conventional methods, e.g., with lime, Portland cement, calcium carbonate and like setting agents, can be employed, e.g., liquid and semi-liquid industrial, agricultural and domestic liquids, sludges and slurries. As will be obvious to those skilled in the art, the solidification of very dilute aqueous wastes, i.e., those with very low solids contents which are conventionally subjected to a simple dewatering process, e.g., primary settling, anerobic digestion and/or activated sludge treatment, to concentrate the solids therein is not economically feasible. Accordingly, the starting wastes for the process of this invention are those with high solids contents, i.e., preferably at least 10% and more preferably at least 30% by weight. As stated above, the starting wastes are aqueous, solid, liquid and semi-liquid wastes, preferably with a free water content of about 30 to 90%, more preferably about 40 to 70% by weight.

In carrying out the process of this invention, the starting wastes in the form of a liquid, sludge or slurry, is mixed with a metallurgical slag in an alkaline medium and in the presence of an agent which promotes the hydration of the slag.

The solidifying agents employed in the process are particulate metallurgical slags, i.e., hydratable water-insoluble by-products from metal refining.

Examples of metallurgical slag which can be employed are scoriae and slags obtained during the manufacture and the various treatments of irons, cast irons and steels, as well as non-ferrous metals, e.g., blast furnace slags, scoriae from steel-works or from electrically heated furnaces. Particularly suitable as slags are products having about the following composition: 30 to 50% CaO, 25 to 40% $SiO_2$, 8 to 20% $Al_2O_3$, 5 to 15% FeO, 2 to 8% MgO and traces of minor elements, e.g., S, Na, K, Mn in various forms.

To ensure adequate contact of the slag with the starting waste, the slag is employed in particulate form. This can be achieved by breaking the slag into small fragments and grinding the fragments into small granules, e.g., of a diameter of 1 mm or less.

The treatment of the starting waste with slag is conducted under alkaline conditions, viz., at a pH above 8.5, e.g., about 8.5 to 14. If the slag does not provide the requisite alkalinity, the alkalinity can be achieved by adding a small quantity of a basic agent, e.g., an alkali metal or alkaline earth metal hydroxide, for example, sodium, potassium or calcium hydroxide or any compound providing such an hydroxide by hydration, e.g., sodium and calcium carbonates, sodium silicates, Portland cement, clinker cement and sodium aluminate. Compounds which form calcium hydroxide by hydration are preferred.

The process of this invention also employs one or more agents which promote the hydration of the slag while in contact with the water contained in the starting waste. These hydration promotors or activators are preferably products containing sulfate ions and at least a small quantity, e.g., 0.1% or more, of an alkali metal ion such as, for example, alkali metal sulfates or a mixture of gypsum and an alkali metal hydroxide. In addition to sulfates and hydroxides, other products providing alkali metal ions which can be employed include alkali metal chlorides, nitrates and nitrites.

The results achieved by the process of the invention are improved by employing in the mixture hereabove described natural or artificial pozzolana or like product, e.g., fly ash or clinkers obtained from the combustion of coal, garbage or like combustible material. Such pozzolanic products are preferably added in a quantity at least equal to four times the quantity of the free lime content of the mixture. The agents employed to activate, i.e., promote, the hydration of the slag also promote the pozzolanic reaction, which avoids any cracking of the final solidified waste material.

Improved results are achieved when the process is conducted in the presence of a limited amount of occluded air, e.g., about 3 to 4% by volume of the total reaction mixture. Limiting the amount of occluded air in the reaction mass can be achieved by the addition thereto of one or more emulsifying agents, which also have the effect of improving the hydration reaction of the slag granules as well as homogenizing wastes which contain hydrocarbons or vegetable or animal oils. Suitable emulsifying agents include stearates and lignosulfonates, ethanolamine, sulfonated polyethers and other ionic emulsifying agents, fine inorganic powders, e.g., bentonite and kieselguhr.

Optionally, one or more hydrophobic polymeric materials such as emulsified bitumen, phenolic or furannic resins, polyester resins, butadiene-styrene latex, vinyl polymers, e.g., polyvinyl acetate, can also be added to the reaction mass in order to further improve the resistance in regard to leaching.

The optimum proportion of the various constituents employed in the process of this invention are easy to determine by those skilled in the art, taking into account the various parameters, e.g., the type and composition of the sludge to be treated, type of slag used, the size of the solid materials, etc. Generally, the best results are obtained employing the following mixtures, per 100 parts by weight of starting waste:

5 to 35 parts of metallurgical slag;
0.02 to 15 parts of alkaline agent;
0.2 to 30 parts, preferably 0.2 to 8 parts, of hydration promoting agent; and
0 to 150 parts, preferably 5 to 30 parts, of pozzolana, fly ash or clinker, plus, optionally, 0 to 2 parts of one or more emulsifying agents and/or hydrophobic material.

Within the above limits, one skilled in the art can readily determine the optimum proportions of reactants for each type of waste to be treated. In particular, the quantity of sulfate ions present in the mixture waste-reactants is chosen to produce solidified waste without cracks. If the quantity of sulfate ions is too low, the material tends to crack. Conversely, if the quantity of sulfate ions is too high, the material is subjected to internal pressures and tends to break up. Simple preliminary experiments are sufficient to enable one skilled in the art to determine the optimum quantity of sulfate ions to be added for any specific waste to be treated.

In the process of the invention, the interactions between the waste, the slag and other reactants are extremely complex due to the diverse composition and structure of wastes of various origins. A certain number of observations have therefore been made and lead to the following explanations which are not intended as a limitation of the invention.

Upon contact with the free water of the starting waste, hydration of the slag takes place due to the sulfate ion-containing activators and to the presence of small quantities of alkali metal ions, whereby the structure of the slag particles is opened. Physical study of the resultant products (by X-rays or equivalent means) shows the formation of hydrated silicates less basic and more stable than those obtained by hydration of Portland cement, and also of sulfoaluminates of the "ettringite" type having the empirical formula:

$$3CaO, Al_2O_3, 3CaSO_4, 32H_2O.$$

There is also formed compounds having a high absorbent power of the type: $x$ CaO, $y$ SiO$_2$, $z$ H$_2$O. Due to the interaction of the reactants with the anions and cations of the waste, the latter precipitate in the form of calcium silicates and complex silicates which are relatively insoluble under the conditions of the reaction medium. Finally, the excess of free lime, which often remains after the neutralization of wastes, is eliminated by the products of the pozzolanic type, which contributes to the formation of stable calcium silicates. The improvement in the qualities of the treated waste material occur over a very long period of time, particularly when pozzolanic reactions occur in the reaction mixture.

The combination of these reactions cause a hardening and a solidification of the starting waste to form a product which is stable under normal conditions, some of which have physico-chemical properties like products found in nature. These solid materials can be used as fillings, as absorbent material acting as a cation and anion exchange resin to improve sanitary landfills, as fertilizers or as soil conditioners or the like.

When the starting sludge or other waste contains one of the reactants necessary in the process of this invention, it obviously is unnecessary to add more of that reactant.

In carrying out the process of this invention, the waste is first made homogeneous. Experience has shown that even with very viscous slurries, for example, having a viscosity of about 100,000 centipoises, good homogeneity can be achieved by agitation, e.g., employing self-starting centrifugal pumps, buckets activated by winches, or by other equivalent means. The treatment of the waste can be carried out batch-wise or continuously in stationary or mobile units according to well-known methods. For example, the usual equipment used for preparing concretes and mortars, e.g., mixers with a delivery conveyor, rotating vat, etc., or for transporting concrete and liquid wastes, e.g., vacuum trucks, etc., can be employed. The waste is treated either in the tank where it is stored after homogenization or by pumping the sludge or slurry to a plant (stationary or mobile), where the addition of reactants is carried out. The treated waste material can then be deposited as landfill.

Without further elaboration, it is believed that one skilled in the art can, using the proceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

To compare the results of the water lixivation of raw wastes and of wastes treated according to the process of the invention, thereby showing the pollutant retention power of the solid waste materials obtained according to the process of this invention, the following ecological test was used for all the examples: 900 g of tap water were added to 90 g of the untreated or solidified waste material and the mixture was vigorously stirred for about one minute and then permitted to stand for 72 hours in a tightly closed flask having a diameter of about 10 cm. After this time, the ion content and the chemical oxygen demand (COD) of the supernatant liquid was measured and compared with that of the untreated waste material to determine the percentage of pollutants washed from the solid waste material by lixivation.

EXAMPLE 1

The starting waste was residue from a motor-car works and consisted of a mixture of various sludges from a melting plant, from a unit for the treatment of soluble oils and from a phosphatation plant.

The waste was mixed with the following (per 100 parts of waste):

1.6 parts of a mixture of gypsum and sodium hydroxide containing 15% NaOH;

1.15 parts of a wetting agent (sodium alkylbenzene sulfonate) employed to introduce about 3% of occluded air in the material; and 15 parts of a metallurgical slag having the following composition (in %):

$SiO_2$: 32.85; $Al_2O_3$: 14.50; $Fe_2O_3$: 0; FeO: 10; MnO: 0.55; CaO: 44.80; MgO: 4.80; $SO_3$: 0; $CO_2$: 0; S: 0.9; $K_2O$: 0.7; $Na_2O$: 0.3; soluble $Na_2O$: 0.02; free CaO: 0

After mixing, the mixture was permitted to harden at ordinary temperature. A very stable solid material was obtained. Lixivation with water, of samples of the starting waste and of the treated waste, according to the previously described ecological test, under the same conditions gave the results shown in Table 1. It can be seen from Table 1 that the quantity of pollutant ions washed away by water is substantially lower in the case of the treated waste material compared to the starting raw waste. For the most ions, the quantity is lowered to a negligible value.

EXAMPLE 2

The waste to be treated was from a plant in which surface treatments of various metallic materials were carried out and was in the form of a sludge containing 34% dry (at 600° C.) solids which contained:

chromium: 12%; copper: 7.5%; zinc: 3.5%; aluminum: 7.6%; iron: 1.3%; ammonium ($NH_4^+$): 3.6% nickel: 0.4%; mercury: 30 p.p.m. (parts per million); lead: 10 p.p.m.; cadminum: 15 p.p.m.; and boron: 1.3%.

The treatment was carried out employing a mixture of 7 parts of the same slag as described in Example 1, 10 parts of a mixture of slag and Portland cement (CLK 325) and 0.20 parts of sodium hydroxide per 100 parts of the waste to be treated.

The waste material solidified within a few days and the ecological test on the starting and treated material gave the results shown in Table 2.

CLK 325: slag cement with clinker containing at least 80% of granulated slag, about 10% of clinker and 3% or less of $SO_3$ and having a compressive strength of 325 bar after 28 days' setting (French standard AFNOR: P 15305).

EXAMPLE 3

The waste to be treated was a petroleum industry sludge containing the following main elements (in p.p.m.):

aluminum: 3500; calcium: 46000; barium: 1430; zinc: 370; lead: 1800; nickel: 20; manganese: 110; iron: 6300; copper: 230; chromium: 45; sodium: 830; potassium: 40000; phosphate ions: 2400; sulfate ions: 210000; nitrate ions: 1900

For the treatment, 100 parts by weight of the waste were mixed with 15 parts of the slag employed in Example 1; 1.5 parts of Portland cement (CPA 400: artificial Portland cement having a compressive strength of 400 bar after 28 days' setting (French standard AFNOR: P 15302)); 1.5 parts of an aqueous solution of sodium silicate (40°–42° Baume) and 2 parts of pozzolana.

A perfect solidification was obtained in few days and lixiviation with water by the ecological test gave the results shown in Table 3, from which it can be seen that most pollutant ions were totally or in major portion retained in the solid mass.

EXAMPLE 4

The starting sludge was from the decantation pond of a chemical works comprising plants for organic, inorganic and biochemical reactions. Its dry solids content was abour 21%. It contains tars, organic solvents, inorganic elements, including calcium, iron, silicon and, in lesser quantities, barium, copper, tin, aluminum, lead, manganese and zinc.

In carrying out the treatment of this invention, 100 parts of sludge were mixed with 18 parts of slag (having the same composition as in Example 1), 1.8 parts of gypsum, 0.5 parts of sodium silicate (40°–42° Baume) and 2 parts of pozzolana.

The material solidified in a few days and the nauseous odor of the waste disappeared quickly.

Lixiviation according to the ecological test gave the following results:

| Elements | Raw waste mg/l | Leached from Treaded Solid Waste mg/l |
|---|---|---|
| Cd | 0.50 | ≦ 0.05 |
| Cr | 1.0 | ≦ 0.04 |
| Fe | 39.40 | ≦ 0.05 |
| Mn | 0.40 | ≦ 0.05 |
| Cu | 1.50 | ≦ 0.05 |
| Ni | 0.30 | ≦ 0.05 |

-continued

| Elements | Raw waste mg/l | Leached from Treaded Solid Waste mg/l |
|---|---|---|
| Pb | 0.40 | ≦ 0.05 |
| Zn | 1.05 | ≦ 0.05 |
| Ca | 139.2 | 17.0 |
| COD | 2400 | 460 |

EXAMPLE 5

100 Parts of a sludge from a waste water purifying plant were treated by adding thereto 15 parts of the slag described in Example 1, 1.5 parts of Portland cement, 1.5 parts of gypsum and 2 parts of fly ash. The distinctive odor of the sludge as well as the bacterial content thereof disappeared very quickly and a solid material was obtained which, after lixiviation, did not substantially contain pollutant (leachable) ions or contained only low traces of such pollutants, as shown in Table 4.

EXAMPLE 6

The starting waste was farming waste from a piggery (pig manure) and had the following characteristics and composition: dry material: 16.1%; COD: 160,000; total nitrogen: 0.9%; $P_2O_5$: 0.71%; $K_2O$: 0.31%; copper: 800 p.p.m.; zinc: 1600 p.p.m. and manganese: 228 p.p.m. After adding lime (6 g lime per liter of waste) 100 parts of waste were added along with 8 parts of slag, 1.3 parts of a gypsum containing 10% sodium hydroxide, and 1.1 parts of fly ash. The quantity of occluded air was about 4%.

After solidification in two days, the material had only a very slight odor and the ecological test gave the following results:
COD: 600 p.p.m.
copper: 0.2 p.p.m.
zinc: 0.4 p.p.m.
manganese: 0.2 p.p.m.

EXAMPLE 7

The starting sludge was from a plant for treating industrial wastes. Its pH was about 7 and it had the following composition:

ferric hydroxide: 10%; chromium, nickel, copper and zinc hydroxides: 5% (total); water content: 60%; the remaining consisting substantially of calcium sulfate.

For the treatment, 100 g of sludge were added to 6 g of the slag described in Example 1, 4 g of either fly ash or clinker coming from incineration of garbage, 0.3 g of gypsum and 1.1 ml of sodium silicate 40°–42° Baume. Hardening began immediately and, within few days, a very hard material was obtained. After lixiviation with water, according to the ecological test, the following results were obtained:
copper: 0.3 p.p.m.; zinc: 0.5 p.p.m.; nickel: 0.4 p.p.m.; chromium: 0.5 p.p.m.

EXAMPLE 8

The waste to be treated came from an industrial waste treatment plant and contained 20% of heavy hydrocarbons and 4% (total) chromium, nickel, iron, arsenic, cadmium and lead compounds.

To 100 kg of this sludge were added 96 kg of lime, 15 kg of slag finely ground (2800 Blaine), 4 kg of gypsum, 56 kg of fly ash (containing 1% alkali metal compounds). After 6 days at a temperature lower than 0° C., a hardened material was obtained upon which a man could walk.

The treated waste, after 5 days, when subjected to the lixiviation test, contained 0.1 p.p.m. of leachable hydrocarbons. After 6 weeks, the leachable hydrocarbon content of the waste was about 0.03 p.p.m.

EXAMPLE 9

To 150 g of a sludge waste having a high (85%) water content and a low viscosity from a plant for producing antibiotics and consisting essentially of products from the decomposition of amylaceous materials were added 40 g of slag, 10 g of gypsum and 140 g of fly ash containing about 1% alkali metal compounds.

Five days after the treatment, the resultant solidified waste had a COD of about 110 p.p.m.

TABLE 1

| | pH | $F^-$ | $NO_3^-$ | $SO_4^{2-}$ | $PO_4^{3-}$ | B | Na | Ca | Al | Fe | Cr | Ni | Cu | COD |
|---|---|---|---|---|---|---|---|---|---|---|---|---|---|---|
| Raw Waste | 7.1 | 2 | 7 | 240 | 0.2 | 2 | 80 | 150 | 10 | 0.1 | 0.2 | 0.05 | 0.09 | 167 |
| Solid Treated Waste | 8.1 | 0.5 | 5.4 | 90 | ≦0.1 | ≦0.5 | 46 | 41 | 0.9 | ≦0.1 | ≦0.02 | ≦0.02 | ≦0.04 | 75 |

TABLE 2

| | pH | F | $SO_4^{2-}$ | $PO_4^{3-}$ | $NH_4^+$ | $Al^{3+}$ | Zn | Ni | Pb | Cu | Cr | COD |
|---|---|---|---|---|---|---|---|---|---|---|---|---|
| Raw Waste | 6.3 | 6 | 130 | 3 | 31 | 8 | 1.2 | 0.08 | 1 | 0.67 | 4.8 | 76 |
| Solid Treated Waste | 8.6 | 2 | 80 | 0.67 | 18 | 0.1 | ≦0.1 | 0.02 | ≦0.1 | 0.09 | 0.2 | 39 |

TABLE 3

| | Cr | Cu | Mn | Ni | Pb | Zn | K | Ba | Ca | $SO_4^{2-}$ | $NO_3^-$ | Na |
|---|---|---|---|---|---|---|---|---|---|---|---|---|
| Raw Waste | 0.2 | 0.30 | 0.3 | 0.9 | 3.7 | 1 | 180 | 1.8 | 380 | 600 | 29 | 320 |
| Solid Treated Waste | ≦0.01 | 0 | 0 | 0.04 | 0 | 0.1 | 21 | 0.3 | 89 | 36 | 2.1 | 7 |

TABLE 4

| | Cl | $NO_3^-$ | $PO_4^{3-}$ | $SO_4^{2-}$ | Zn | Ni | Pb | Fe | Cu | Cr | Cd | COD |
|---|---|---|---|---|---|---|---|---|---|---|---|---|
| Raw Waste | 60000 | 105 | 8000 | 150 | 250 | 19 | 33 | 470 | 13 | 25 | 3 | 180000 |
| Solid Treated Waste | 40 | 2 | 9 | 30 | ≦0.10 | ≦0.10 | ≦0.20 | ≦0.10 | 1 | ≦0.20 | ≦0.10 | 590 |

All the above data are in p.p.m. (parts per million)

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the treatment of solidifiable aqueous wastes containing water-soluble environmental pollutants with a sufficient quantity of setting agent which converts the pollutants into a water-insoluble mass, the improvement which comprises treating the aqueous waste in a homogeneous condition, employing as the setting agent a particulate water-insoluble slag from metal refining, in the presence of a slag hydration-promoting combination of, sulfate and alkali metal ions and wherein 100 parts of starting waste are mixed with 5 to 35 parts of said slag, 0.02 to 15 parts of alkaline agent, 0.2 to 30 parts of said hydration-promoting combination, 0 to 2 parts of emulsifying agent and 0 to 150 parts of pozzolana, fly ash or clinker, there being sufficient alkalinity in the additives to yield a pH above 8.5 in the resultant mixture.

2. A process according to claim 1 wherein the alkaline conditions are obtained by the addition to the reaction mixture of an alkali metal hydroxide, an alkaline earth metal hydroxide or an alkaline agent yielding such a hydroxide by hydration.

3. A process according to claim 2 wherein the compound added to obtain the alkaline conditions is selected from the group consisting of sodium and calcium carbonates, sodium silicates, sodium aluminate and alkaline agents comprising them.

4. A process according to claim 3 wherein the alkaline conditions are obtained with cement clinkers or Portland cement.

5. A process according to claim 1 wherein the hydration-promoting combination comprises gypsum, phosphogypsum or an alkali metal sulfate.

6. A process according to claim 1 wherein the alkali metal ions are provided by an alkali metal chloride, nitrate of nitrite.

7. A process according to claim 1 wherein pozzolana, fly ash, clinkers, or a mixture thereof is added to the reaction mixture.

8. A process according to claim 1 wherein an emulsifying agent is added to the reaction mixture.

9. A process according to claim 1 wherein a hydrophobic polymeric material is added to the reaction mixture.

10. A process according to claim 1 wherein the slag contains about 30 to 50% CaO, 25 to 40% $SiO_2$, 8 to 20% $Al_2O_3$, 5 to 15% FeO and 2 to 8% MgO.

11. A process according to claim 1 wherein 0.2 to 8 parts of hydration-promoting agent and 5 to 30 parts of pozzolana, fly ash or clinker are employed per 100 parts of starting waste.

12. A process according to claim 1, wherein the aqueous waste contains at least 10% by weight solids.

13. A process according to claim 1, wherein the aqueous waste contains 40–70% by weight of free water.

* * * * *